Patented Nov. 5, 1940

2,220,834

UNITED STATES PATENT OFFICE 2,220,834

PHENOLIC TRIAMINES

Herman A. Bruson and Clinton W. MacMullen, Philadelphia, Pa., assignors to The Resinous Products & Chemical Company, Philadelphia, Pa.

No Drawing. Application March 14, 1939, Serial No. 261,773

3 Claims. (Cl. 260—247)

This invention relates to new phenols having the formula

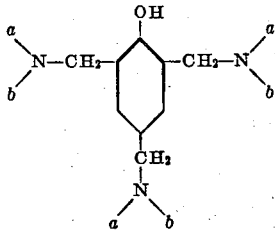

wherein $a$ and $b$ are chosen from the group consisting of open chain lower aliphatic radicals and divalent aliphatic groups which jointly with the nitrogen atom form a heterocyclic ring.

These new compounds are obtained by reacting one mol of phenol with at least three mol equivalents each of formaldehyde and a secondary amine having the formula

wherein $a$ and $b$ have the above-mentioned significance.

Typical amines which are suitable for the purpose are, for example, dimethylamine, diethylamine, dipropylamine, di-isopropylamine, diallylamine, capryl methylamine, di-n-butylamine, diethanolamine, di-isopropanolamine, piperidine, piperazine, morpholine, pyrrole, pyrrolidine, and the like.

The reaction may be carried out by mixing the components in any order, and either allowing the mixture to stand at ordinary temperature for some hours, or heating it at 90–100° C. to complete the condensation in a shorter time.

The products obtained are oily or crystalline bodies, the lower members of which can be distilled under reduced pressure without decomposition. They are useful as pickling inhibitors, corrosion inhibitors, fungicides, and modifying agents for starches, dextrines, casein, glue, cellulose, and textile fibres. With starch they give insoluble products which serve as sizings for textiles as set forth in a copending application, Ser. No. 254,884, filed February 6, 1939, by Louis H. Bock and Alva L. Houk. The lower members, particularly the tri-(morpholino-methyl)- and tri-(dimethylamino-methyl)-phenol, are soluble in cold water, the latter compound, curiously, being almost insoluble in hot water. They can be reacted with organic acid halides to form esters. They combine with alkyl halides, dialkyl sulfates, arlkyl halides and reactive organic esters to form new quaternary ammonium salts which are useful as waterproofing agents for fabrics, as fixatives for direct dyestuffs, and as bactericidal and fungicidal compounds.

The following examples illustrate this invention:

Example 1

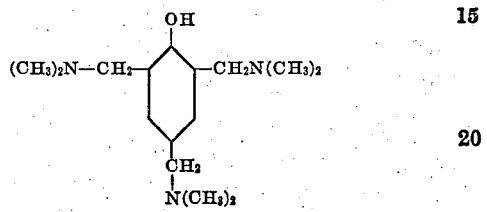

| | Grams |
|---|---|
| Phenol (1 mol) | 94 |
| 25% dimethylamine solution (4 mols) | 720 |
| 30% formaldehyde solution (3.5 mols) | 350 |

The phenol was dissolved in the dimethylamine solution and the mixture was cooled to 20° C. The formaldehyde solution was then added dropwise to the mixture while the mixture was stirred and cooled to 20–25° C. The addition required about 30 minutes. The mixture was stirred for ten minutes longer at 20–25° C. and then heated under reflux at 90–95° C. for about one and one-quarter hours. To the hot solution 200 g. of sodium chloride was added and the mixture stirred for 20 minutes. An oil layer separated from the hot solution, was removed, and distilled under reduced pressure.

The fraction boiling between 130° and 150° C. at 1–2 mm. was collected. It weighed 228 g. (86% yield) and consisted of a colorless oil having the appearance and consistency of glycerine. When pure, tri-(dimethylamino-methyl)-phenol boils at 130–135° C./1 mm. Specific gravity, 0.974 at 15° C.

It is readily soluble in alcohol, benzene, acetone, or cold water, but is almost insoluble in hot water.

Although in the above procedure an excess of amine and formaldehyde above 3 mols is used to one mol of phenol, the product can also be obtained in somewhat reduced yield, by using exactly three mols each of dimethylamine and formaldehyde per mol of phenol, or by using only a slight excess (5 to 10%) of the amine and formaldehyde.

An alternative procedure is the following:

| | Grams |
|---|---|
| Phenol (2 mols) | 188 |
| 25% dimethylamine solution (7 mols) | 1260 |
| 30% formaldehyde solution (7 mols) | 700 |

The dimethylamine and formaldehyde are each added to the phenol simultaneously in dropwise fashion over a period of two hours while the mixture is stirred and cooled to 20–25° C. The mixture is then stirred for about 20 hours at the ordinary temperature. The small layer of oil which separates is washed with cold water to extract the desired product, and this extract is combined with the lower aqueous layer which is then saturated with sodium chloride and extracted with benzene. The benzene extract is then distilled. The yield of vacuum distilled tri-(dimethylamino-methyl)-phenol by this method is 405 g., B. P. 130–140° C./1 mm., containing 15.73% nitrogen by analysis. (Calculated value is 15.84% nitrogen.)

*Example 2*

| | Grams |
|---|---|
| Phenol (1 mol) | 94 |
| Diethylamine (94.5%) (4 mols) | 309 |
| 30% formaldehyde solution (3.5 mols) | 350 |

The formaldehyde was added gradually to the cooled, stirred mixture of the phenol and the diethylamine, while the temperature was kept at 15–25° C. The mixture was stirred and warmed for one hour on a steam bath under a reflux condenser. The product was extracted with benzene and the benzene extract evaporated under reduced pressure on a steam bath. The residual oil obtained weighed 315 g. and contained tri-(diethylamino-methyl)-phenol, 94% pure.

*Example 3*

| | Grams |
|---|---|
| Phenol (1 mol) | 94 |
| Morpholine (3.5 mols) | 305 |
| 30% formaldehyde solution (3.3 mols) | 330 |

The formaldehyde was added dropwise during 30 minutes to the well-stirred mixture of phenol and morpholine while the mixture was cooled to 20° C. The turbid solution obtained was then stirred for several hours at 20–25° C. and finally heated for one hour at 85–90° C., during which time it became clear. The clear solution obtained was concentrated in vacuum on a steam bath until all the water had come off. The product thus obtained was a viscous, yellow oil which slowly crystallized almost completely on standing. The white crystalline mass was recrystallized from ethyl acetate, yielding large colorless crystals of tri-(morpholino-methyl)-phenol containing 10.64% nitrogen by analysis (theory=10.78% nitrogen) and melting at 106–107° C. It is soluble in cold or in hot water. It has the probable formula:

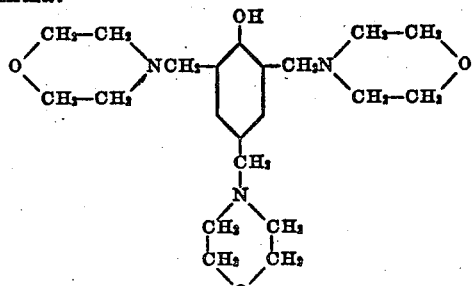

*Example 4*

In the same manner, diethanolamine yields a water-soluble tri-($\beta$, $\beta'$-dihydroxy-diethylamino-methyl)-phenol when condensed with phenol and formaldehyde, as set forth in Example 3. It is a viscous oil which cannot be distilled without decomposition.

Likewise piperidine condenses as in Example 2 to yield a tri-(piperidino-methyl)-phenol as a yellow oil which is insoluble in water.

All of the above compounds, when boiled with excess of acetic anhydride, form the hitherto unknown tetra-acetate of trimethylolphenol, having the formula:

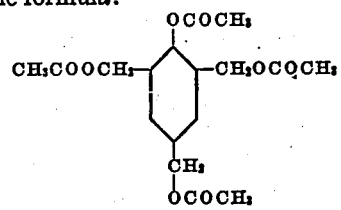

which is a colorless, viscous oil boiling at 200–210° C./1 mm., and which is an excellent plasticizer for certain synthetic resins, cellulose nitrate, cellulose acetate, and other cellulose esters or ethers.

We claim:
1. A phenol having the formula

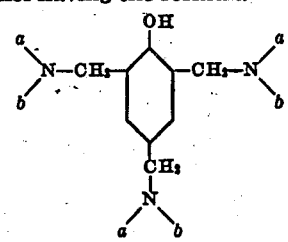

wherein $a$ and $b$ are chosen from the group consisting of open chain lower aliphatic radicals and divalent aliphatic groups which, jointly with nitrogen atom, form a heterocyclic ring.

2. 2,4,6-tri-(dimethylamino-methyl)-phenol, said substance, when pure, being a colorless, water-soluble oil.

3. 2,4,6-tri-(morpholinomethyl)-phenol, said substance, when pure, being a crystalline, water-soluble compound.

HERMAN A. BRUSON.
CLINTON W. MACMULLEN.